July 25, 1933.   B. M. MILLS ET AL   1,919,446
CONTROL APPARATUS
Filed July 31, 1928   2 Sheets-Sheet 1

Inventors
Bertram M. Mills
George K. Crossley
by Roberts Cushman Woodbury
Attys.

July 25, 1933.  B. M. MILLS ET AL  1,919,446
CONTROL APPARATUS
Filed July 31, 1928   2 Sheets-Sheet 2

Inventors
Bertram M. Mills
George K. Crossley
by Roberts Cushman Woodberry
Att'ys.

Patented July 25, 1933

1,919,446

UNITED STATES PATENT OFFICE

BERTRAM M. MILLS AND GEORGE K. CROSSLEY, OF PAWTUCKET, RHODE ISLAND, ASSIGNORS TO THE STANDARD ENGINEERING WORKS, OF PAWTUCKET, RHODE ISLAND, A CORPORATION

CONTROL APPARATUS

Application filed July 31, 1928. Serial No. 296,608.

This invention pertains to automatic regulators, and more particularly to humidity regulators such as are commonly employed for controlling the action of moistening, drying, heating and refrigerating apparatus and the like. Such regulators usually comprise an element which is sensitively responsive to variations in the moisture content of the air, and by its response to such variations initiates directly or indirectly the operation of means of suitable character for bringing about the desired atmospheric condition, for example, a predetermined per cent humidity.

Devices for indicating, recording, or regulating the moisture content of the air have long been known, but while theoretically and for some purposes at least practically useful, such devices have not in all cases been wholly satisfactory. Thus in many instances the apparatus is sluggish in operation and lags far behind changes in atmospheric conditions; in some such apparatus the parts are so delicate that they will not long withstand the effects of constant vibration such as occurs in many industrial establishments; other devices fail to function when exposed to the accumulation of lint and other dust present in cotton, flour, or other mills or factories; while in many cases the devices are complex, costly, and require frequent and skilled attention to keep them in operative condition.

The present invention provides a humidity regulator of extremely simple construction which may be built at relatively low cost; which contains few moving parts; which is quick and very sensitively responsive to moisture variations; which is sturdy and durable and capable of long continued operation under adverse conditions, for example when subjected to heavy vibration, a dusty and lint laden atmosphere, or inattention and lack of care; and which is reliable and substantially fool-proof.

In accordance with this invention the moisture responsive element is freely exposed to the atmosphere of the room, duct, or compartment, being guarded if desired against physical injury by appropriate means, for example, protective rods, bars, or screens, while the parts actuated by this moisture responsive element are housed within a box or casing where they are protected from lint, dust, corrosion, and mechanical injury, although readily accessible for inspection, lubrication, etc.

For purposes of illustration we have here chosen to show the primary controlling mechanism forming the immediate subject matter of the present invention as associated with relay means, for example, a magnetic switch, which in turn operates or controls the operation of air moistening or drying apparatus as, for example, by moving valves, operating fans, or determining the operation of spray heads or nozzles, all in a manner familiar to those skilled in the art. While such magnetic relay means is desirable, we contemplate that the present invention is of broader utility and may be associated, for example, with pneumatic or other fluid actuated relay devices or, in fact, may directly control or actuate the moisture varying elements if desired. While we have herein for convenience made reference to the control of moisture as the primary function of our novel apparatus, it is to be understood that it may thus be employed as the indirect means for varying temperature or other physical conditions and that while we have referred to a moisture responsive element as the primary actuating means, we contemplate that such actuating means may be of such a nature as to respond to the presence of other substances in the air when water vapor, for example, certain specific gases or non-aqueous vapors, and in any case that the ultimate apparatus controlled by such actuating means will be of a character appropriate to the desired end.

In the accompanying drawings we have illustrated one embodiment of our invention by way of example, and in the drawings, Fig. 1 is a front elevation of the apparatus showing the door to the casing or housing closed;

Figure 2:
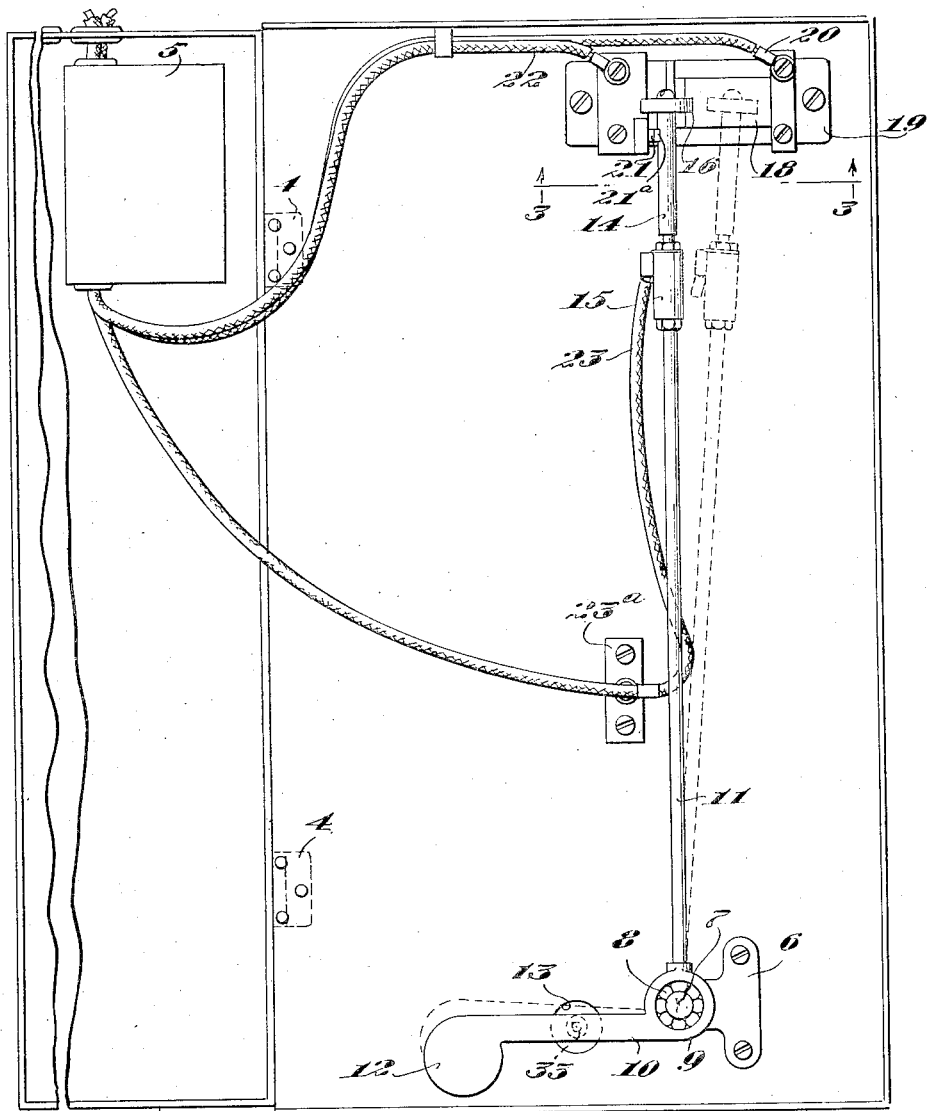
Fig. 2 is a front elevation, partly broken away, showing the housing or casing with its door fully open.

Referring to the drawings, the numeral 1 indicates generally a housing or casing forming a support for our novel apparatus and enclosing certain portions thereof. This housing may be made of any suitable material, for example sheet metal, and as here shown comprises the box-like rear or base portion 2 and the cover 3 secured to the base portion by means of hinges 4. The base or rear portion 2 is intended to be secured against a wall or other suitable support by suitable fasteners, brackets, or the like, and this rear portion forms a container for the relay device 5 (Fig. 2). This relay device may be of any suitable character such as is commonly employed in the art and which is adapted to receive the relatively feeble impulses resulting from the movement of the moisture responsive element and to transmit such feeble impulses into force of sufficient magnitude to actuate the ultimate controlling devices through which the moisture or other conditions to be regulated are controlled or varied. This relay device may, for example, be of pneumatic character having suitable small and readily movable valves which control the operation of larger valves or, as here illustrated, the relay may be of magnetic or electrical type in which a feeble current energizes a magnet or solenoid which in turn operates a switch in a power circuit. Under some circumstances such relay device may constitute the immediate means for operating the moisture controlling apparatus, and in referring to a relay device we wish it to be understood that we intend to include all such arrangements through which the movements of the regulator parts are transmitted to the moisture controlling apparatus.

In accordance with our present invention we mount a bracket 6 on the inside of the cover 3, such bracket having a projecting pivot pin 7 encircled by ball bearings 8 upon which is mounted a bell crank lever 9. As here shown this bell crank lever is arranged to swing in a substantially vertical plane, the ball bearings permitting the lever to swing with the greatest ease and freedom. As illustrated this bell crank lever comprises a substantially horizontal arm 10 and a substantially vertical arm 11. The arm 10 is provided with a counterweight 12 and with a boss 13 projecting outwardly through an opening 13ª in the door 3.

Figure 3:
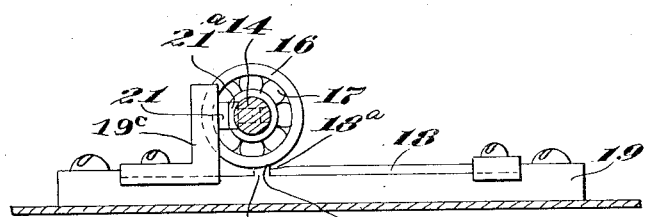
Fig. 3 is a fragmentary section, to larger scale, substantially on the line 3—3 of Fig. 2.

The upper part of the arm 11 consists of a metallic member 14 secured to the lower part of the arm by an electrically insulating coupling 15. At its upper end the part 14 carries a metal roller 16 preferably mounted upon ball bearings 17 (Fig. 3). The roller 16 is adapted to engage a metallic guide rail or contact plate 18 mounted on an insulating block 19 secured to the inner surface of the cover 3. The block 19 preferably has a boss 19ª adjacent to the end of the plate 18, said boss having an inclined cam face whose high corner 19ᵇ is disposed in a plane slightly forward of the front face of plate 18. Preferably the front face of plate 18 is slightly recessed at 18ª. A flexible electrical conductor 20 is connected at one end to the plate 18 while its other end is secured to a terminal in the relay device 5. The insulating block 19 carries a bracket 19ᶜ supporting an electrical contact 21 forming an abutment or stop member engageable by a contact 21ª carried by the part 14, thereby limiting movement of the arm 11 in one direction. This contact member 21 is insulated from the plate 18 and is connected to one end of the electrical conductor 22 which also leads to the relay 5. A third electrical conductor 23 is connected at one end to the member 14 and also leads to the relay 5, being supported if desired at an intermediate point by a bracket 23ª secured to the cover 3.

Figure 1:
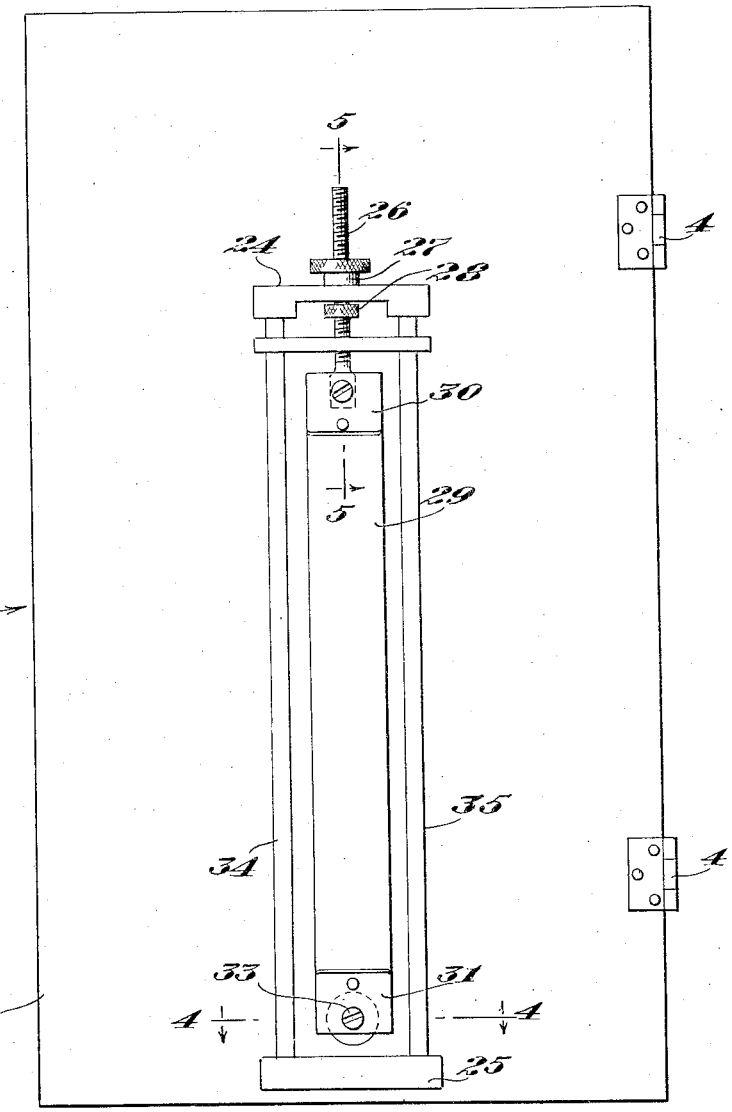

A bracket 24 (Fig. 1) is secured to and projects outwardly from the outer surface of the cover 3 and preferably a similar bracket 25 is disposed below the bracket 24. The bracket 24 is provided with an opening for the passage of a vertically adjustable rod 26. This rod is screw threaded for the reception of an adjusting nut 27 bearing upon the upper surface of the bracket 24, and if desired a lock nut 28 may be arranged below the bracket 24 to retain the rod 26 in adjusted position. The lower end of the rod 26 constitutes an anchorage or abutment for the upper end of the moisture responsive element.

Figure 5:
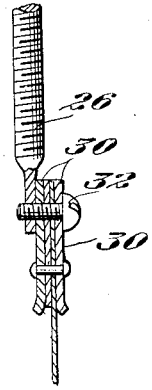
Fig. 5 is a fragmentary detail section, to larger scale, substantially on the line 5—5 of Fig. 1.
Figure 4:
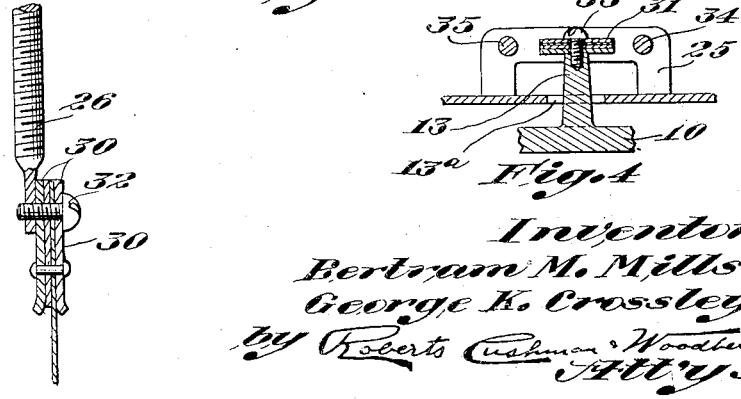
Fig. 4 is a fragmentary section substantially on the line 4—4 of Fig. 1.

As here shown this moisture responsive element comprises a ribbon-like strip 29 of flexible material of suitable character, such strip being permanently secured at its upper end to a rigid clamp or clip 30 (Fig. 5) of metal or other suitable material, preferably being riveted or otherwise permanently fixed to the clip. A similar clip 31 is secured to the lower end of the strip 29, the clips 30 and 31 constituting attaching devices whereby the strip is mounted in proper position in the apparatus. As one means of detachably securing the moisture responsive element in position, we provide the clips 30 and 31 with openings for the reception of attaching screws. Thus the screw 32 detachably secures the clip 30 to the lower end of the rod 36 while the screw 33 detachably secures the lower clip 31 to the boss 13 on the lever arm 10.

The moisture responsive strip 29 may be of any suitable type but is here shown as arranged to act by tension to operate the mechanical parts. A great many substances have been proposed and used as moisture responsive elements in apparatus of this general type. Such substances include wood, paper, parchmentized paper, artificial silk, the strong fibers from various plants, and many other vegetable substances, while a great variety of animal substances have also been employed for this purpose, among them hair, rawhide, vellum, visceral membranes of both land and water animals (of which catgut, gold beater's skin, etc. may be mentioned as examples), animal sinews, silk, and silk worm gut. Such substances have long been known as equivalents for the intended purpose and we make no specific claim thereto except in combination with the other features of our invention. However, we prefer to employ a ribbon-like strip of the selected substance since such a strip, particularly if very thin, reacts more rapidly and with less lag to moisture variations than would a thick rod or block.

In thus referring to a "ribbon-like" strip we intend to include not only material which is integrally homogeneous throughout its width but also a ribbon-like band consisting of a plurality of parallelly arranged strands or fibers, since the latter arrangement, if the fibers or strands be of uniform character and relatively small diameter, functions in substantially the same way as a homogeneous strip.

Since certain visceral membranes of animals, when properly cured, possess considerable strength, although usually quite thin and flexible, and since such substances may readily be prepared in the form of a ribbon-like strip of suitable length, we prefer to employ substances of this type, and suggest gold beater's skin as satisfactory, but wish it to be understood that any of the substances above mentioned as well as other equivalent substances may be used if desired.

The operation of the above device is substantially as follows, it being assumed that the parts occupy the position shown in Fig. 2 when, for example, the moisture in the air is at a maximum, that is to say of the desired predetermined per cent humidity. Under these conditions the moisture responsive element 29 may be assumed to be of maximum length, so that the weight 12 acting upon the bell crank lever 9 holds the contact member 21ª against the fixed contact 21, thus closing an electrical circuit including the parts 23, 21ª, 21, 22, and the relay terminals, thus energizing a magnetic switch (not shown) or other equivalent device forming part of the relay, such device, when energized directly or indirectly, stopping the operation of the air moistening apparatus.

In moving to bring the contacts 21ª and 21 into engagement the lever 11 carries roller 16 up and over the high point 19ᵇ of the boss 19ª, this being permitted by the resiliency of the long lever arm, and as the roller engages the cam face of the boss 19ª a component of thrust in the the direction of the fixed contact 21 is developed, so that inadvertent separation of the contacts by vibration or the like is substantially prevented.

Assuming that the per cent humidity of the air drops below the predetermined desired amount, the moisture absorbent element 29 will respond to this change in atmospheric conditions, and will shorten, thus lifting the arm 10 of the bell crank lever and swinging the contact 21ª away from the contact 21, thus breaking the circuit through the conductors 23 and 22. As the roller 16 drops from high point 19ᵇ of the boss 19ª it engages the elongate contact plate or rail 18, and thereby a circuit is closed through the conductor 23, the member 14, the roller 16, the plate 18 and the conductor 20. The closing of this circuit energizes the same or another magnetic switch, or the like, forming a part of the relay, and thereby operates suitable mechanism for starting the air moistening apparatus into operation. During the operation of the moistening apparatus the contact roller 16 travels along the plate 18 first in one direction and then in the other, but maintaining the circuit until the moisture in the air rises to such an extent as to restore the bell crank lever to its original position with the contact 21ª in engagement with the contact 21, whereby the air moistening apparatus is again brought to rest.

It will be noted that the moisture absorbent element 29 is fully exposed at the exterior of the casing to the outside air, and in order to protect it against mechanical injury, we propose to provide guard posts or rods 34 and 35 mounted in the brackets 24 and 25. These guard rods may be replaced by a suitable screen, although we prefer the rods since they do not appreciably interfere with the free flow of air over and about the moisture responsive element. As above described, this moisture responsive element is readily removable for replacement when broken or otherwise damaged, and we propose to provide such moisture responsive elements, comprising the strip 29 and the attaching devices 30 and 31, for interchangeable application to the apparatus disclosed. Since the moving parts are enclosed within the housing, they are not subject to mechanical injury or to the accumulation of dust and lint to any extent, although they are readily accessible for inspection, lubrication etc. The single counterbalanced lever, mounted upon ball bearings and with a ball bearing contact roller 16 acting as a guide and support for the longer arm of the lever, opposes a minimum resistance to movement so that very slight changes in length of the moisture responsive element are readily transmitted to the contact member 21ª. The adjustable rod 26 provides for initial setting of the parts to accommodate moisture absorbent elements of different length, but aside from this single adjustment no other adjustment is necessary, and the apparatus is substantially proof against tampering by unskilled persons.

While we have herein shown one desirable embodiment of the invention, we wish it to be understood that variations in details, as for example in the shape and relative arrangement of parts, may be made without departing from the spirit of the invention. We also contemplate that the moisture responsive element may be arranged to act through compression rather than tension and that the specific arrangement of the electrical contacts disclosed may be replaced by others in accordance with the type of relay employed or, if the relay be of pneumatic type, may be replaced by suitable valve devices.

We claim:

1. Apparatus of the class described comprising a housing having an opening in its wall, a lever within the housing, said lever having a substantially vertical arm and a substantially horizontal arm, a moisture responsive element outside of the housing, means passing through the opening in the housing and connecting the moisture responsive element to the horizontal arm of the lever, means tending to move said latter arm in such a direction as to take up slack in the moisture responsive element, a relay device in the housing, and means carried by the vertical arm of the lever for actuating the relay device.

2. Apparatus for regulating moisture control means, said apparatus comprising a support, a swinging lever mounted thereon, a moisture responsive element connected to the lever and adapted to swing the latter in response to varying moisture conditions, anti-friction guide means for the free end of the lever, a stop limiting the movement of the lever in one direction, and means responsive to movement of the lever for determining the action of the moisture control means.

3. Apparatus of the class described comprising a housing having an opening in its wall, a lever within the housing, anti-friction bearings for the lever, anti-friction guide means for an arm of the lever, a member projecting outwardly from an arm of the lever through the opening in the wall of the housing, a moisture responsive element outside of the housing, means operatively connecting one end of said element to the outwardly projecting member, and normally fixed but adjustable means positioning the opposite end of the moisture responsive element.

4. In apparatus of the class described, in combination a bell-crank lever mounted on anti-friction bearings to swing freely in a substantially vertical plane, one arm of said lever being substantially horizontal, a weight on said latter arm tending to swing the lever in one direction, a moisture responsive element connected to said arm and under certain conditions swinging the lever in opposition to the weight, the lever having a substantially vertical arm, a roller mounted on anti-friction bearings near the end of the latter arm, a metallic contact rail with which the roller engages, and a stop member with which a part of the lever makes electrical contact at one end of its path of movement.

5. In apparatus of the class described, in combination a support, a bracket carried by the support, a lever mounted to swing on anti-friction bearings interposed between it and the bracket, an anti-friction roller carried by the lever, said roller engaging a guide element carried by the support, said lever comprising an electrically insulated part constituting a current closing contact, a fixed contact engageable by said insulated part as the lever swings in one direction, means tending to swing the lever in one direction, and a moisture responsive element connected to the lever and operative under certain moisture conditions to swing the lever in the opposite direction.

6. In apparatus of the character described, the combination of a moisture responsive element, movable electrical contact means actuable thereby, a fixed contact engageable by said movable contact means to complete an electrical circuit and stop the air moistening means when a predetermined per cent humidity has been obtained, and rigid means opposing resistance to separation of said contacts.

7. In apparatus of the character described, the combination of a moisture responsive element, movable electrical contact means actuable thereby, a fixed contact engageable by said movable contact means to complete an electrical circuit and stop the air moistening means when a predetermined per cent humidity has been obtained, a second fixed contact spaced from the fixed contact, and means interposed between said contacts opposing free movement of the movable contact means from one fixed contact to the other.

BERTRAM M. MILLS.
GEORGE K. CROSSLEY.